United States Patent
Wojciechowski

(10) Patent No.: US 10,386,183 B2
(45) Date of Patent: Aug. 20, 2019

(54) LEVEL WITH SLOTTED ENGAGEMENT OF FULL WIDTH BINDINGS

(71) Applicant: Diamond Tech LLC, Carson City, NV (US)

(72) Inventor: Timothy J. Wojciechowski, Hubertus, WI (US)

(73) Assignee: Diamond Tech LLC, Carson City, NV (US)

( * ) Notice: Subject to any disclaimer, the term of this patent is extended or adjusted under 35 U.S.C. 154(b) by 221 days.

(21) Appl. No.: 15/481,640

(22) Filed: Apr. 7, 2017

(65) Prior Publication Data

US 2018/0292207 A1  Oct. 11, 2018

(51) Int. Cl.
  *G01C 9/24* (2006.01)
  *G01C 9/28* (2006.01)

(52) U.S. Cl.
  CPC ................. *G01C 9/28* (2013.01); *G01C 9/24* (2013.01)

(58) Field of Classification Search
  CPC .................................. G01C 9/24; G01C 9/28
  USPC ..................................................... 33/379, 451
  See application file for complete search history.

(56) References Cited

U.S. PATENT DOCUMENTS

| | | | | |
|---|---|---|---|---|
| 312,548 A | * | 2/1885 | Atkinson | G01C 15/00 33/273 |
| 817,467 A | | 4/1906 | Chase | |
| 824,109 A | | 6/1906 | Gibson | |
| 1,113,805 A | | 10/1914 | McNeil | |
| 1,256,737 A | * | 2/1918 | Small | G01C 9/28 33/379 |
| 1,298,010 A | * | 3/1919 | Coleman | G01C 9/28 33/451 |
| 1,306,765 A | | 7/1919 | Powell | |
| 3,522,657 A | * | 8/1970 | Metrulis | G01B 3/08 33/332 |
| 3,724,087 A | * | 4/1973 | Ostrager | G01C 9/28 33/348 |
| 4,534,117 A | * | 8/1985 | Haefner | G01C 9/28 277/641 |
| 5,020,232 A | * | 6/1991 | Whiteford | G01C 9/32 33/348.2 |
| 5,075,978 A | * | 12/1991 | Crowe | G01C 9/32 33/348.2 |
| 5,406,714 A | | 4/1995 | Baker et al. | |
| 5,412,875 A | * | 5/1995 | Hilderbrandt | G01C 9/28 33/374 |

(Continued)

*Primary Examiner* — Christopher W Fulton
(74) *Attorney, Agent, or Firm* — Boyle Fredrickson, S.C.

(57) ABSTRACT

A level having a main body with a top surface, a bottom surface, and a pair of side surfaces extending therebetween, and a full-width binding member engaged with the main body and overlying at least one of the top and bottom surfaces. The binding member includes a main binding wall and a pair of spaced apart arms extending from the main binding wall. Each side surface of the main body includes a longitudinally extending indentation extending inwardly from the side surface at a location spaced from the surface over which the binding member is positioned Each of the spaced apart arms includes an engagement member secured within one of the axially extending indentations. The level may include a pair of full-width binding members, one of which overlies the top surface of the main body and the other of which overlies the bottom surface of the main body.

11 Claims, 4 Drawing Sheets

(56) References Cited

U.S. PATENT DOCUMENTS

| | | | | |
|---|---|---|---|---|
| 6,237,237 B1 * | 5/2001 | McKenna | ............... | G01C 9/28 |
| | | | | 33/374 |
| 6,381,859 B1 * | 5/2002 | Wedemeyer | ............. | G01C 9/26 |
| | | | | 33/365 |
| 7,536,797 B2 * | 5/2009 | Steffens | .................. | G01C 9/02 |
| | | | | 33/365 |

* cited by examiner

LEVEL WITH SLOTTED ENGAGEMENT OF FULL WIDTH BINDINGS

FIELD OF THE INVENTION

The present invention relates to a level and, more particularly, to a level with a slotted engagement of a full-width binding member to provide structural reinforcement for the level.

BACKGROUND OF THE INVENTION

Conventional levels generally include at least one bubble vial secured to an elongated body. The body may be constructed of metal, plastic, wood, other organic materials, or other rigid materials, and has a cross-section that may vary between models, but commonly is in the form of solid member, a box beam having a generally rectangular cross-section, or an I-beam having I-shaped cross-section.

When the body of the level is solid and formed of a material such as wood, prior art levels of this type have further included corner bindings located at each corner of the body to protect the corners of the level from impact damage. However, the corner bindings provide no additional reinforcement to the body. That is, the corner bindings fail to prevent twisting and warping of the level as the material of the body absorbs and releases moisture.

In addition, the corner bindings fail to protect the entire width of the gauging surface of the level from impact damage which may be caused during use, such as, for example, by using the level to tap bricks or blocks into place, etc. That is, the material of the level is exposed on the gauging surfaces of the level because the corner bindings only protect the corners of the body, not the entire gauging surface. Further, the corner bindings may come loose over time after repeated impacts.

As such, there is a need in the art for a level with a full-width binding member to provide structural reinforcement for the body of the level in addition to providing a gauging surface. There is further a need for a level with binding members that protect the corners of the frame while also providing reinforcement which prevents warping and twisting of the body during impacts and as the material of the body absorbs and releases moisture.

SUMMARY OF THE INVENTION

The present invention provides for a level with a slotted engagement of a full-width binding member to provide structural reinforcement for the level and to provide the gauging surface of the level.

According to one aspect of the invention, a level may include a main body having a top surface, a bottom surface, and first and second side surfaces extending therebetween. A first upper outer notch is formed in the first side surface adjacent the top surface, a second upper outer notch is formed in the second side surface adjacent the top surface, and at least one upwardly facing top notch is formed in the top surface. Likewise, a first lower outer notch is formed in the first side surface adjacent the bottom surface, a second lower outer notch is formed in the second side surface adjacent the bottom surface, and at least one downwardly facing bottom notch is formed in the bottom surface. Representatively, the upwardly facing top notch and the downwardly facing bottom notch may be located in the center of the top and bottom surfaces, respectively. A top binding member has a main binding wall, a first outer side arm extending downwardly from a first side of the main binding wall, a second outer side arm extending downwardly from a second side of the main binding wall, and at least one intermediate arm extending downwardly from the main binding portion between the first and second sides of the main binding wall. Similarly, a bottom binding member has a main binding wall, a first outer side arm extending upwardly from a first side of the main binding wall, a second outer side arm extending upwardly from a second side of the main binding wall, and at least one intermediate arm extending upwardly from the main binding wall between the first and second sides of the main binding wall. Representatively, the intermediate members of the top and bottom binding members may be centrally located between the first and second side arms of the top and bottom members, respectively.

The first outer arm of the top binding is configured to interfit with the first upper outer notch of the main body, the second outer arm of the top binding is configured to interfit with the second upper outer notch of the main body, and the at least one intermediate arm of the top binding is configured to interfit with the at least one upwardly facing top notch of the main body. Similarly, the first outer arm of the bottom binding is configured to interfit with the first lower outer notch of the main body, the second outer arm of the bottom binding is configured to interfit with the second lower outer notch of the main body, and the at least one intermediate arm of the bottom binding is configured to interfit with the at least one downwardly facing bottom notch of the main body.

According to another aspect of the invention, a level includes a main body, a first binding, and a second binding. The main body has first and second outer notches disposed at first and second corners, respectively, of the main body, with a first surface of the main body being located between the first and second outer notches. At least one first intermediate notch may be disposed between the first and second corners of the main body. The main body also has third and fourth outer notches disposed at third and fourth corners, respectively, of the main body, with a second surface of the main body being located between the third and fourth notches. At least one second intermediate notch may be disposed between the third and fourth corners of the main body. The first binding is coupled to the main body over the first surface, and includes a main binding wall, a first outer arm extending from a first side of the main binding wall and engaged with the first outer notch, a second outer arm extending from a second side of the main binding wall and engaged with the second outer notch, and may also include at least one intermediate arm extending from main binding wall at a location between the first and second sides of the main binding wall and engaged with the first intermediate notch. The second binding is coupled to the main body over the second surface, and includes a main binding wall, a first outer arm extending from a first side of the main binding wall and engaged with the third outer notch, a second outer arm extending from a second side of the main binding wall and engaged with the fourth outer notch, and at least one intermediate arm extending from the main binding wall at a location between the first and second sides of the main binding wall and engaged with the second intermediate notch.

According to yet another aspect of the invention, a method of manufacturing a level includes providing a main body, the main body having a first surface and a second surface, coupling a first binding to the first surface of the main body, and coupling a second binding to the second surface of the main body. The first surface of the main body is located between a first outer notch and a second outer notch, and may include at least one intermediate notch. Similarly, the second surface of the main body is located between a third outer notch and a fourth outer notch, and may include at least one intermediate notch. The first binding includes a main binding wall, a first outer arm extending from the main binding wall at a first end of the main binding, a second outer arm extending from the main binding wall at a second end of the main binding, and at least one intermediate arm extending from the main binding wall at a location between the first and second ends of the main binding. Likewise, the second binding includes a main binding wall, a first outer arm extending from the main binding wall at a first end of the main binding, a second outer arm extending from the main binding wall at a second end of the main binding, and at least one intermediate arm extending from the main binding wall at a location between the first and second ends of the main binding. The first binding is coupled to the first surface of the main body by engaging the first arm of the first binding within the first outer notch of the main body, engaging the second arm of the first binding within the second outer notch of the main body, and engaging the intermediate arm of the first binding within the intermediate notch in the first surface of the main body. Similarly, the second binding is coupled to the second surface of the main body by engaging the first arm of the second binding within the third outer notch of the main body, engaging the second arm of the second binding within the fourth outer notch of the main body, and engaging the intermediate arm of the second binding within the intermediate notch in the second surface of the main body Other aspects, objects, features, and advantages of the invention will become apparent to those skilled in the art from the following detailed description and accompanying drawings. It should be understood, however, that the detailed description and specific examples, while indicating representative embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

DETAILED DESCRIPTION

The present invention and the various features and advantageous details thereof are explained more fully with reference to the non-limiting embodiments described in detail in the following description.

Figure 1:
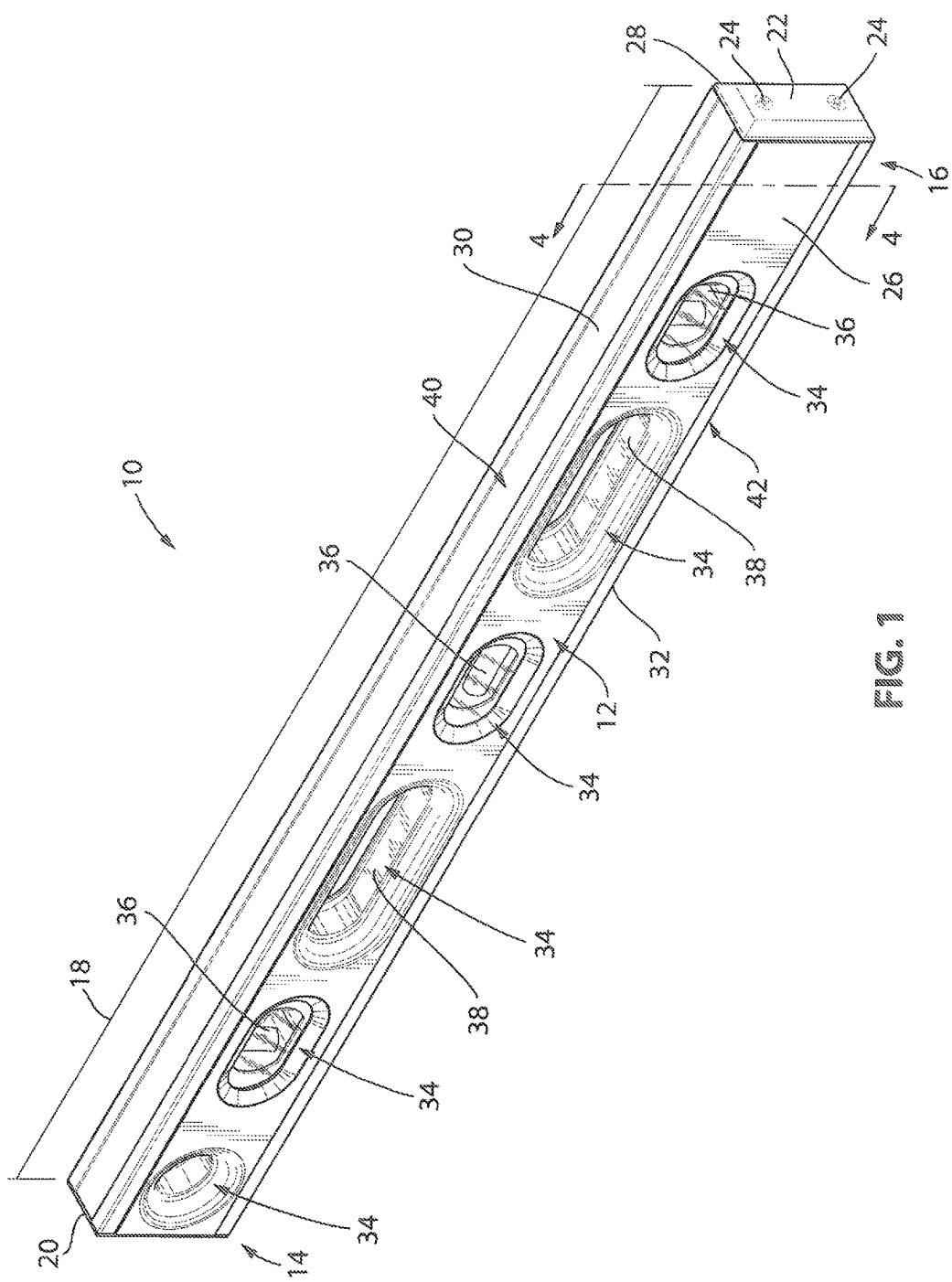
FIG. 1 is a perspective view of a level, according to an embodiment of the invention.
Figure 2:
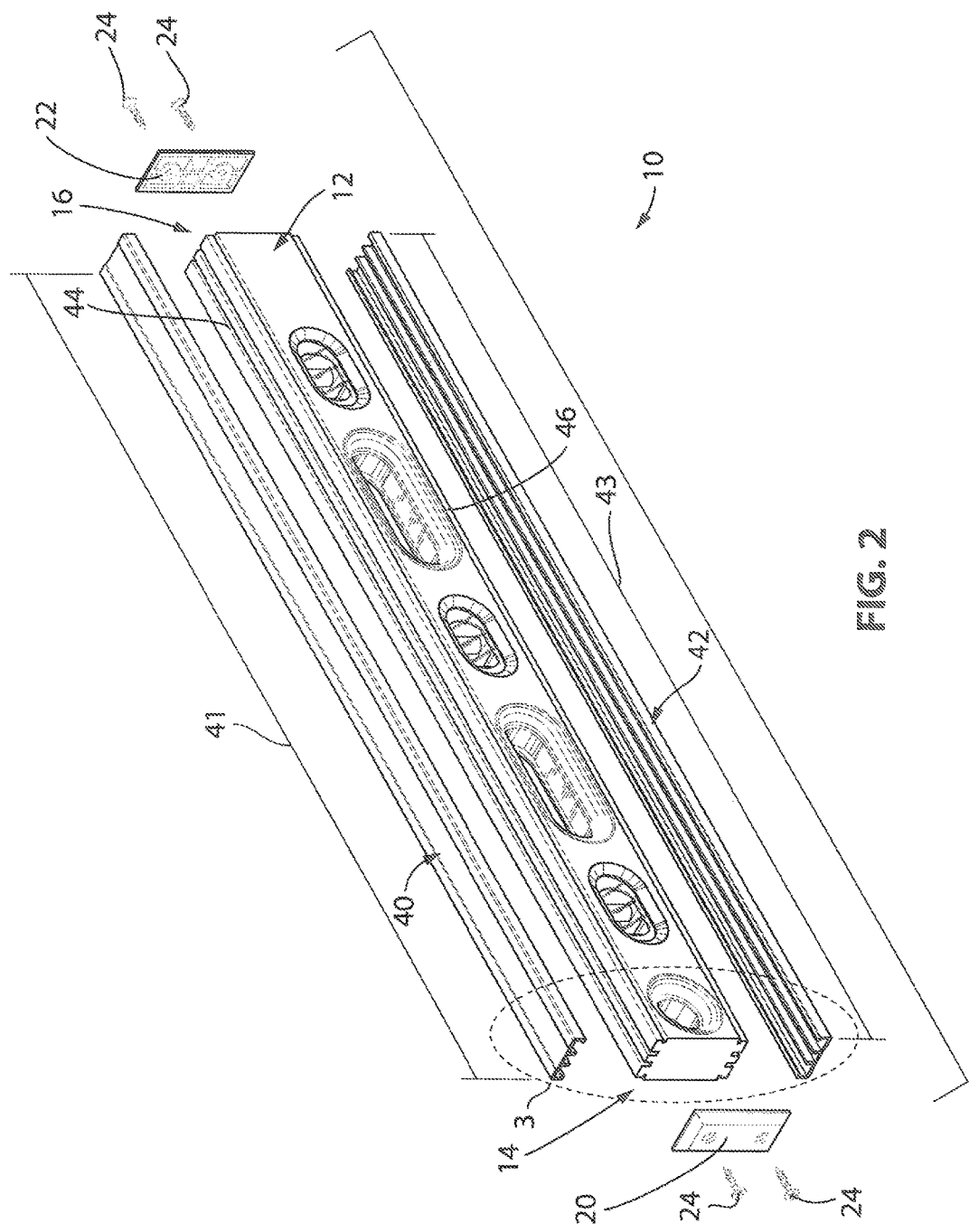
FIG. 2 is an exploded isometric view of the level of FIG. 1, according to an embodiment of the invention.

Referring first to FIGS. 1 and 2, a perspective view and an exploded isometric view of a level 10 in accordance with the present invention are shown. The level 10 includes a main body 12 having a first end 14 and a second end 16 and extending for a length 18 in between the first end 14 and the second end 16. A first end cap 20 and a second end cap 22 are coupled to the first end 14 and the second end 16 of the level 10, respectively. In the representative embodiment of the invention, the first and second end caps 20, 22 are coupled to their respective first and second ends 14, 16 via a series of fasteners 24. While FIGS. 1 and 2 depict the use of two (2) fasteners 24 per each end cap 20, 22, alternative embodiments of the invention may use more or less than two (2) fasteners 24. Further alternative embodiments of the invention may use any other coupling arrangement in lieu of the fasteners 24, for example, but not limited to, an adhesive. Additionally, the number of fasteners 24 and/or alternative coupling arrangement used to couple the first end cap 20 to the first end 14 of the level 10 is independent of the number of fasteners 24 and/or coupling arrangement used to couple the second end cap 22 to the second end 16 of the level 10.

The level 10 further includes a first side surface 26, a second side surface 28, a top surface 30, and a bottom surface 32. A number of openings 34 are formed through the main body 12 of the level 10 between the first and second side surfaces 26, 28 at various locations along the length 18 of the main body 12 of the level 10. A number of angle indicators, such as level or plumb vials 36, may be disposed in some of the openings 34, and others of the openings 34 may be left empty in order to provide a user with a hand grip 38 to hold the level 10, in a manner as is known. In the representative embodiment of the invention as shown, the level 10 includes six (6) openings 34 formed through the main body 12 of the level 10, three of which contain angle indicators 36. In other embodiments of the invention, the level 10 may include any number of openings 34 more or less than six (6) and any number of angle indicators 36 more or less than three (3), again in a manner as is known.

The top surface 30 of the level 10 includes a top binding 40 attached to the main body 12. The bottom surface of the level 10 includes a bottom binding 42 attached to the main body 12. The positioning and configuration of the top and bottom bindings 40, 42 will be described below in further detail. In the illustrated embodiment of the invention, the main body 12 of the level 10 is formed of a first material, such as, but not limited to, wood, plastic or other material. The top and bottom bindings 40, 42, respectively, are formed of a hard, durable second material, such as, but not limited to, metal.

Figure 3:
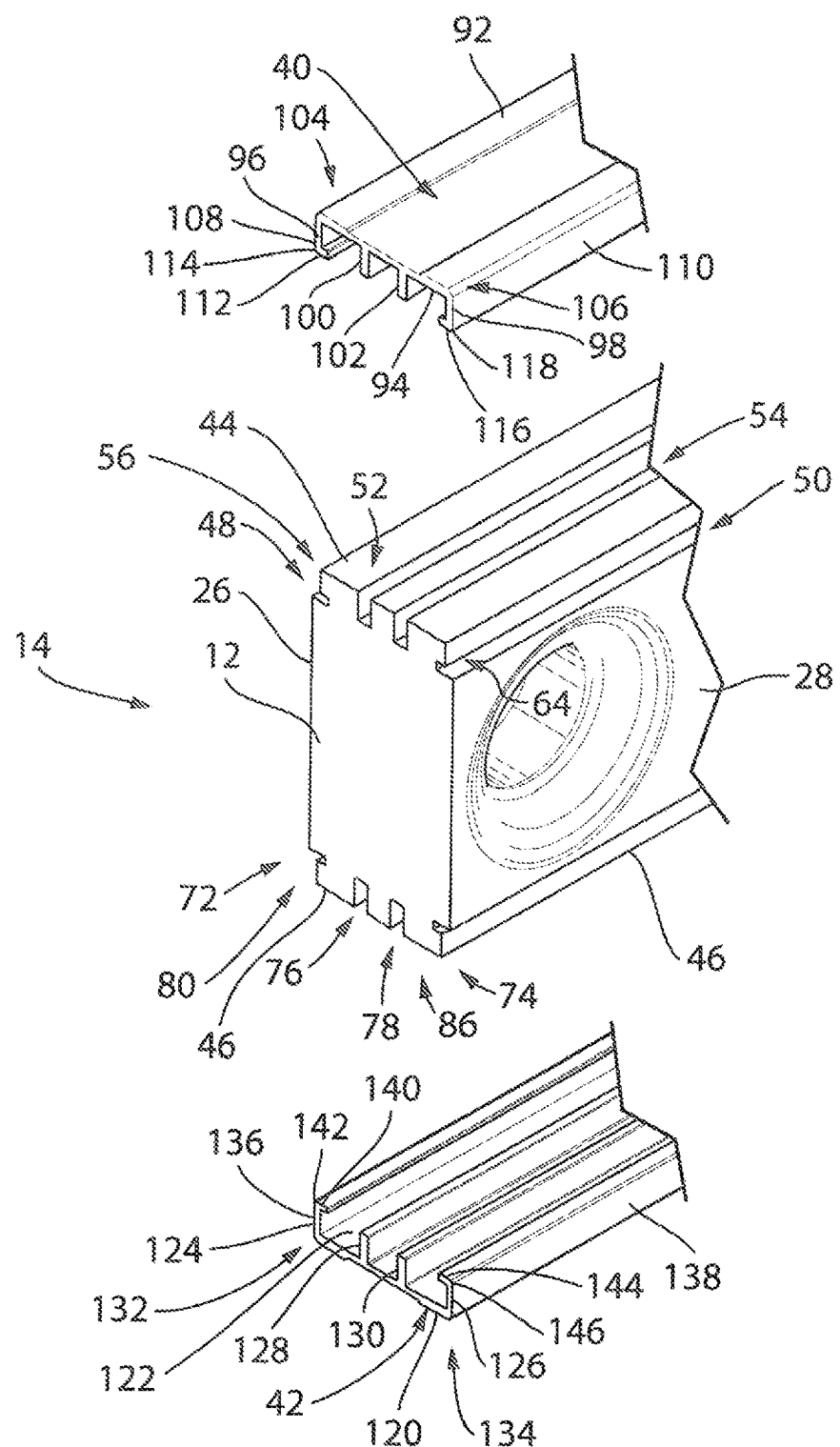
FIG. 3 is an enlarged exploded isometric view of an end of the level of FIG. 1, according to an embodiment of the invention.

FIG. 3 illustrates an enlarged exploded isometric view of the first end 14 of the level 10. The main body 12 of the level 10 includes indentations in the form of slots, grooves, or notches on and adjacent to the top surface 44 and the bottom surface 46 of the main body 12. In the representative embodiment of the invention, four (4) notches are provided on or adjacent to the top surface 44: a left outer upper notch 48, a right outer upper notch 50, and intermediate notches in the form of a left top center notch 52 and a right top center notch 54. While FIG. 3 illustrates the use of two (2) intermediate top center notches 52, 54, other embodiments of the invention may use more or less than two (2) top center notches. In other words, the top surface 44 of the main body 12 may include a single notch or three (3) or more notches. The left upper outer notch 48 is formed in the side surface 26 of the main body 12 at the upper left corner 56 of the main body 12 and extends along the length 18 of the main body 12, but in other embodiments may extend along less than the entire length 18 of the main body 12. The left upper outer notch 48 extends inwardly from the side surface 26 of the main body 12 below the top surface 44, and in the illustrated embodiment the left upper outer notch 48 is oriented so as to be parallel to the top surface 44. It is understood, however, that the left upper outer notch 48 may be oriented at an angle that is non-parallel to the top surface 44. The portion of the side surface 26 between the top surface 44 and the left upper outer notch 48 is offset inwardly relative to the side surface 26 located below the left upper outer notch 48, for reasons that will later be explained.

In a similar manner, the right upper outer notch 50 is formed in the side surface 28 of the main body 12 at the upper right corner 64 of the main body 12 and extends along the entire length 18 or less than the entire length 18 of the main body 12. The right upper outer notch 50 extends inwardly from the side surface 28 of the main body 12 below the top surface 44, and in the illustrated embodiment the right upper outer notch 50 is oriented so as to be parallel to the top surface 44. It is understood, however, that the right upper outer notch 50 may be oriented at an angle that is non-parallel to the top surface 44. The portion of the side surface 26 between the top surface 30 and the right upper outer notch 50 is offset inwardly relative to the side surface 28 located below the right upper outer notch 50, for reasons that will later be explained.

The left and right intermediate notches 52, 54 in the top surface 44 of the main body 12 are located so as to be spaced inwardly from the upper left corner 56 and upper right corner 64, respectively, of the main body 12. While FIG. 3 illustrates the left and right intermediate notches 52, 54 as extending from the top surface 44 of the main body 12 at an angle perpendicular thereto, it is also contemplated that the left and right intermediate notches 52, 54 may extend from the top edge 44 of the main body 12 at angles other than 90 degrees. Further, the left and right intermediate notches 52, 54 may extend from the top surface 44 of the main body 12 at angles different from one another. In addition, each intermediate notch 52, 54 may independently extend along the entire length 18 or less than the entire length 18 of the main body 12.

In the representative embodiment of the invention as illustrated, the bottom surface 46 is similar to the top surface 44 and includes its own four (4) indentations in the form of slots, grooves or notches: a left lower outer notch 72, a right lower outer notch 74, a left intermediate notch 76, and a right intermediate notch 78. As with the intermediate notches 52, 54 described above with respect to the top surface 44, while FIG. 3 illustrates the use of two (2) intermediate notches 74, 76 of the bottom surface 46, other embodiments of the invention may use more or less than two (2) intermediate notches. That is, the bottom surface 46 of the main body 12 may include a single intermediate notch or three (3) or more intermediate notches. Further, the top and bottom surfaces 44, 46 may have the same or different number of intermediate notches. The left lower outer notch 72 is located at the lower left corner 80 of the main body 12 and extends along the entire length 18 or less than the entire length 18 of the main body 12. The left lower outer notch 72 extends inwardly from the side surface 26 of the main body 12 above the bottom surface 46, and in the illustrated embodiment the left lower outer notch 72 is oriented so as to be parallel to the bottom surface 46. It is understood, however, that the left lower outer notch 72 may be oriented at an angle that is non-parallel to the bottom surface 46. The portion of the side surface 26 between the bottom surface 46 and the left lower outer notch 72 is offset inwardly relative to the side surface 26 located above the left lower outer notch 72, for reasons that will later be explained In a similar manner, the right lower outer notch 74 is formed in the side surface 28 of the main body 12 at the lower right corner 86 of the main body 12 and extends along the entire length 18 or less than the entire length 18 of the main body 12. The right lower outer notch 74 extends inwardly from the side surface 28 of the main body 12 above the bottom surface 46, and in the illustrated embodiment the right lower outer notch 74 is oriented so as to be parallel to the bottom surface 46. It is understood, however, that the right lower outer notch 74 may be oriented at an angle that is non-parallel to the bottom surface 46. The portion of the side surface 28 between the bottom surface 30 and the right lower outer notch 74 is offset inwardly relative to the side surface 28 located above the right lower outer notch 74, for reasons that will later be explained.

The left and right intermediate notches 76, 78 in the bottom surface 46 of the main body 12 are located so as to be spaced inwardly from the lower left corner 80 and lower right corner 86, respectively, of the main body 12. In the representative embodiment of the invention a shown, the left and right intermediate notches 76, 78 extend from the bottom surface 46 of the main body 12 at an angle perpendicular thereto. However, in alternative embodiments of the invention the left and right intermediate notches 76, 78 may extend from the bottom surface 46 of the main body 12 at angles other than 90 degrees. In addition, the left and right intermediate notches 76, 78 may extend from the bottom surface 46 of the main body 12 at angles different from one another. Each intermediate notch 76, 78 may also independently extend along the entire length 18 or less than the entire length 18 of the main body 12.

FIG. 3 further illustrates the top and bottom bindings 40, 42. The top binding 40 includes a main binding wall 92, which creates the top surface 30 of the level 10 when the top binding 40 is attached to the main body 12. The main binding wall 92 of the top binding 40 has a length 41 which may be equal to or less than the length 18 of the main body 12. The top binding 40 further includes a series of arms extending from a bottom surface 94 of the main binding wall 92 and configured to interfit with the notches in the upper portion of the main body 12. For example, the representative embodiment of the invention depicts four (4) arms: a left outer arm 96, a right outer arm 98, a left intermediate arm 100, and a right intermediate arm 102. However, alternative embodiments of the invention may include more or less than four (4) arms. The left outer arm 96 extends downward from the bottom surface 94 of the main binding wall 92 at a first side 104 of the main binding wall 92, and the right outer arm 98 extends downward from the bottom surface 94 of the main binding wall 92 at a second side 106 of the main binding wall 92. While FIG. 3 depicts the left outer arm 96 and the right outer arm 98 extending from the bottom surface 94 of the main binding wall 92 at angles perpendicular thereto, it is also contemplated that the left outer arm 96 and the right outer arm 98 may extend from the bottom surface 94 of the main binding wall 92 at angles other than 90 degrees. Further, the left outer arm 96 and the right outer arm 98 may extend from the bottom surface of the main binding wall 92 at different angles.

In addition, the left outer arm 96 and the right outer arm 98 may independently extend from the first and second sides 104, 106, respectively, of the main binding wall 92 for more than, less than, or equal to the entire length 41 of the top binding 40. It is further noted that the left outer arm 96 and the right outer arm 98 form the left and right sides 108, 110, respectively of the top binding 40.

In addition, the left outer arm 96 includes an extension 112 directed inward from the left side 108 of the top binding 40 and oriented parallel to the main binding wall 92. While the illustrated embodiment of the invention depicts the extension 112 as extending from the left side 108 of the top binding 40 at a bottom edge 114 of the left outer arm 96, the extension 112 may extend from the left side 108 of the top binding 40 at any location between the bottom edge 114 of the left outer arm 96 and the bottom surface 94 of the main binding wall 92. Further, the extension 112 may be oriented at any angle with respect to the main binding wall 92, including parallel thereto.

Similarly, the right outer arm 98 includes an extension 116 directed inward from the right side 110 of the top binding 40 and oriented parallel to the main binding wall 92. While FIG. 3 illustrates the extension 116 being directed inward from a bottom edge 118 of the right outer arm 98, it is also contemplated that the extension 116 may extend from the right outer arm 98 at any location between the bottom edge 118 of the right outer arm 98 and the bottom surface 94 of the main binding wall 92. In addition, other embodiments of the invention may have the extension 116 oriented at any angle with respect to the main binding wall 92, including parallel thereto.

The left and right intermediate arms 100, 102 of the top binding 40 are located so as to be between the first side 104 and the second side 106 of the main binding wall 92. In the representative embodiment of the invention, the left and right intermediate arms 100, 102 extend from the bottom surface 94 of the main binding wall 92 at an angle perpendicular thereto. However, in alternative embodiments of the invention the left and right intermediate arms 100, 102 may extend from the bottom surface 94 of the main binding wall 92 at angles other than 90 degrees. In addition, the left and right intermediate arms 100, 102 may extend from the bottom surface 94 of the main binding wall 92 at angles independent of each other. In addition, the intermediate arms 100, 102 may independently extend along the bottom surface 94 of the main binding wall 92 for more than, less than, or equal to the entire length 41 of the top binding 40.

The bottom binding 42 is similarly constructed to the top binding 40. That is, the bottom binding 42 includes a main binding wall 120, which creates the bottom surface 32 of the level 10 when the bottom binding 42 is attached to the main body 12. The bottom binding 42 has a length 43 that is less than or equal to the length 12 of the main body 12. The bottom binding 42 also includes a series of arms that extend from a top surface 122 of the main binding wall 120 and are configured to interfit with the series of notches in the bottom portion of the main body 12. In the representative embodiment of the invention as shown, the bottom binding 42 includes four (4) arms: a left outer arm 124, a right outer arm 126, a left intermediate arm 128, and a right intermediate arm 130. However, other embodiments of the invention may include more or less than four (4) arms. The left outer arm 124 extends upward from the top surface 122 of the main binding wall 120 at a first side 132 of the main binding wall 120. The right outer arm 126 extends upward from the top surface 122 of the main binding wall 120 at a second side 134 of the main binding wall 120. As shown in FIG. 3, the left outer arm 124 and the right outer arm 126 extend from the top surface 122 of the main binding wall 120 at angles perpendicular thereto. However, it is also contemplated that the left outer arm 124 and the right outer arm 126 may extend from the top surface 122 of the main binding wall 120 at angles other than 90 degrees. Additionally, the left outer arm 124 and the right outer arm 126 may extend from the top surface 122 of the main binding wall 120 at angles independent from each other.

In addition, the left outer arm 124 and the right outer arm 126 may independently extend from the first and second sides 132, 134, respectively, of the main binding wall 120 for more than, less than, or equal to the entire length 43 of the bottom binding 42. It is further noted that the left outer arm 124 and the right outer arm 126 form the left and right sides 136, 138 respectively of the bottom binding 42.

The left outer arm 124 includes an extension 140 directed inward from the left side 136 of the bottom binding 42 and oriented parallel to the main binding wall 120. While the extension 140 is shown as extending from the left side 136 of the bottom binding 42 at a top edge 142 of the left outer arm 124, it is contemplated that the extension 140 may extend from the left side 136 of the bottom binding 42 at any location between the top edge 142 and the top surface 122 of the main binding wall 120. Further, the extension 140 may be oriented at any angle with respect to the main binding wall 120, including parallel thereto.

The right outer arm 126 is constructed similarly to the left outer arm 124. The right outer arm 126 includes an extension 144 directed inward from the right side 138 of the bottom binding 42 and oriented parallel to the main binding wall 120. In the representative embodiment of the invention as shown, the extension 144 is directed inward from a top edge 146 of the right outer arm 126. However, in alternative embodiments of the invention, the extension 144 may be directed inward from the right side 138 of the bottom binding 42 at any location between the top edge 146 of the right outer arm 126 and the top surface 122 of the main binding wall 120. In addition, other embodiments of the invention may have the extension 144 oriented at any angle with respect to the main binding wall 120, including parallel thereto.

The left and right intermediate arms 128, 130 of the bottom binding 42 are located so as to be between the first side 132 and the second side 134 of the main binding 102. As shown in FIG. 3, the left and right intermediate arms 128, 130 extend from the top surface 122 of the main binding wall 120 at an angle perpendicular thereto. Other embodiments of the invention may include the left and right intermediate arms 128, 130 as extending from the top surface 122 of the main binding wall 120 at angles other than 90 degrees. Further, the left and right intermediate arms 128, 130 may extend from the top surface 122 of the main binding wall 120 at differing angles. The intermediate arms 128, 130 may independently extend along the bottom surface 122 of the main binding 120 for more than, less than, or equal to the entire length 43 of the bottom binding 42.

Figure 4:
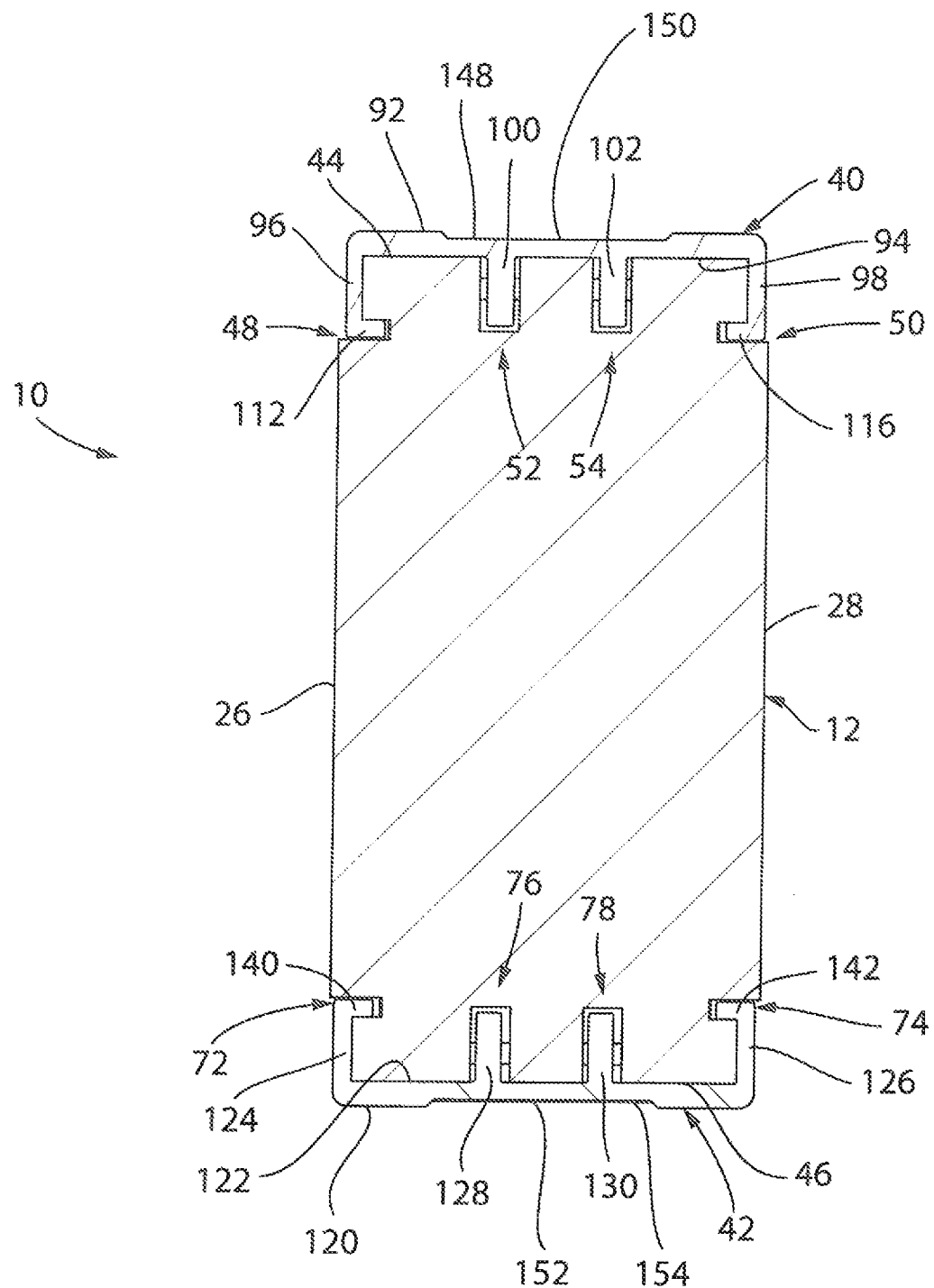
FIG. 4 is cross-sectional view of the level of FIG. 1 taken along line 4-4, according to an embodiment of the invention.

FIG. 4 illustrates how the top binding 40, the bottom binding 42, and the main body 12 interfit to create the level 10. As shown, the top binding 40 is configured to interfit with the top portion of the main body 12 so that the bottom surface 94 of the main binding wall 92 of the top binding 40 overlies the top surface 44 of the main body 12. In the representative embodiment of the invention as shown, the left outer arm 96 of the top binding 40 and its extension 112 are configured to interfit with the left upper outer notch 48 below top surface 44 of the main body 12, the right outer arm 98 of the top binding 40 and its extension 116 are configured to interfit with the right upper outer notch 50 below the top surface 44 of the main body 12, the left intermediate arm 100 of the top binding 40 is configured to interfit with the left intermediate notch 52 of the top surface 44 of the main body 12, and the right intermediate arm 102 of the top binding 40 is configured to interfit with the right intermediate notch 54 of the top surface 44 of the main body 12. As discussed above, alternative embodiments of the invention may have a top binding 40 with more or less than four (4) arms and a main body with more or less than four (4) notches.

Similarly, the bottom binding 42 is configured to interfit with the bottom portion of the main body 12 so that the top surface 122 of the main binding wall 120 of the bottom binding 42 overlies the bottom surface 46 of the main body 12. In the representative embodiment of the invention as shown, the left outer arm 124 of the bottom binding 42 and its extension 140 are configured to interfit with the left lower outer notch 72 above the bottom surface 46 of the main body 12, the right outer arm 126 of the bottom binding 42 and its extension 142 are configured to interfit with the right lower outer notch 74 above the bottom surface 46 of the main body 12, the left intermediate arm 128 of the bottom binding 42 is configured to interfit with the left intermediate notch 76 of the bottom surface 46 of the main body 12, and the right intermediate arm 130 of the bottom binding 42 is configured to interfit with the right intermediate notch 78 of the bottom surface 46 of the main body 12. As discussed above, alternative embodiments of the inventions may have a bottom binding 42 with more or less than four (4) arms and a main body with more or less than four (4) notches.

In addition to the interfitting of arms and notches described above, the top and bottom bindings 40, 42, may be secured to the main body 12 with an adhesive disposed between the top bindings 40, 42, respectively, and the main body 12.

As shown in FIG. 3, the left outer arm 96 of top binding 40 overlies and is positioned against the inwardly offset top portion of side wall 26 above left upper outer notch 48 when top binding 40 is engaged with main body 12. The inward offset of the top portion of side wall 26 is such that the left outer arm 96 is positioned generally flush with, or spaced slightly inwardly from, the side wall 26 below the left upper outer notch 48. The same is true with respect to right outer arm 98 of top binding 40 with respect to side wall 28, right lower arm 124 of bottom binding 42 with respect to side wall 26, and right lower arm 126 with respect to side wall 28. In this manner, the side walls 26, 28 of main body 12 and the top and bottom bindings 40, 42, respectively, cooperate to define a generally rectangular configuration in cross-section for the level 10 when the bindings 40, 42 are secured to the main body 12.

FIG. 4 also illustrates that the top surface 148 of the main binding wall 92 of the top binding 40 may include an indentation 150 formed therein so that the side areas of the top binding 40 provide a top gauging surface for the level 10. Similarly, the bottom surface 152 of the main binding wall 120 of the bottom binding 42 may also include an indentation 154 formed therein so that the side areas of the bottom binding 42 provide a bottom gauging surface for the level 10. In differing embodiments of the invention, the level may include only indentation 150, only indentation 154, or both indentations 150, 154. Further, the indentations 150, 154 may be independently disposed along the entire length of the respective top and bottom binding 40, 42, or less than the entire length of the respective top and bottom binding 40, 42.

While the representative embodiment of the present invention as shown and described contemplates full-width binding members on both the top and the bottom of the level body, it is understood that only one of the top and bottom of the level may be provided with a full-width binding member and that the other may have conventional separate edge bindings as known in the art or may have any other construction as desired. To maximize the advantages provided by the present invention, however, both the top and the bottom of the level body are provided with full-width binding members.

The level as shown and described has a number of advantages over the prior art. First, the full-width top and bottom bindings 40, 42, respectively, fully overlie the respective top and bottom surfaces of the level body so as to provide full upper and lower protection for the material of the level body. In addition, the one-piece construction of the top and bottom bindings 40, 42, respectively, provides side-to-side consistency of each level gauging surface throughout the entire length of the level. Furthermore, engagement of the arms of the bindings within the slots of the level body provides significant torsional reinforcement to assist in maintaining the accuracy of the level even when the level body is subjected to twisting forces along its longitudinal axis.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

What is claimed is:

1. A level comprising:
    a main body having a top surface, a bottom surface, and a pair of side surfaces extending between the top and bottom surfaces;
    a full-width binding member overlying at least an underlying one of the top and bottom surfaces of the level body, wherein the binding member comprises a main binding wall and a pair of spaced apart arms extending from the main binding wall, wherein the main binding wall defines a pair of spaced apart sides, and wherein each arm of the binding member extends from one of the sides of the main binding wall, and wherein the binding member further includes one or more intermediate arms located between the pair of spaced apart arms;
    wherein each side surface of the main body includes a longitudinally extending indentation extending inwardly from the side surface at a location spaced from the underlying one of the top and bottom surfaces, and wherein each of the spaced apart arms includes an engagement member secured within one of the axially extending indentations and
    wherein the main body further includes one or more intermediate longitudinally extending indentations extending into the main body from the underlying one of the top and bottom surfaces between the side surfaces of the main body, wherein the one or more intermediate arms are engaged within the one or more intermediate longitudinally extending indentations.

2. The level of claim 1 wherein each longitudinally extending indentation is oriented in a plane generally parallel to a plane of the underlying one of the top and bottom surfaces, and wherein the main binding wall and the engagement members of the spaced apart arms are oriented in planes generally parallel to each other.

3. The level of claim 1 wherein the one or more intermediate longitudinally extending indentations comprises a pair of intermediate longitudinally extending indentations and wherein the one or more intermediate arms comprises a pair of intermediate arms.

4. The level of claim 1 wherein each side surface of the main body has an inwardly offset portion extending from the underlying one of the top and bottom surfaces to the longitudinally extending indentation, and wherein each arm overlies the inwardly offset portion and is generally flush with the side surface on a side of the longitudinally extending indentation opposite the inwardly offset portion.

5. The level of claim 1 wherein the main body has a generally solid cross-section.

6. The level of claim 1 wherein the full-width binding member comprises a top full-width binding member that overlies the top surface of the main body, and further comprising a bottom full-width binding member that overlies the bottom surface of the main body and having a pair of spaced apart arms, each of which includes an engagement member secured within an axially extending indentation in a side surface of the main body at a location spaced from the bottom surface.

7. A level comprising:
  a main body including:
    a first surface having a first outer notch disposed at a first corner of the main body, a second outer notch disposed at a second corner of the main body, and at least one first intermediate notch disposed between the first and second corners of the main body; and
    a second surface having a first outer notch disposed at a third corner of the main body, a second outer notch disposed at a fourth corner of the main body, and at least one second intermediate notch disposed between the third and fourth corners of the main body;
  a first binding coupled to the main body over the first surface, the first binding including:
    a main binding wall;
    a first outer arm extending from the main binding wall at a first side of the main binding wall and engaged with the first outer notch;
    a second outer arm extending from the main binding wall at a second side of the main binding wall and engaged with the second outer notch; and
    at least one intermediate arm extending from the main binding wall at a location between the first and second sides of the main binding wall and engaged with the first intermediate notch; and
  a second binding coupled to the main body over the second surface, the second binding including:
    a main binding wall;
    a first outer arm extending from the main binding wall at a first end of the main binding wall and engaged with the third outer notch;
    a second outer arm extending from the main binding wall at a second side of the main binding wall and engaged with the fourth outer notch; and
    at least one intermediate arm extending from the main binding wall at a location between the first and second sides of the main binding and engaged with the second intermediate notch.

8. The level of claim 7 wherein the first outer notch extends inward from a first side surface of the main body; the second outer notch extends inward from a second side surface of the main body;
  wherein the first outer arm of the first binding includes an extension that interfits with the first outer notch; and
  wherein the second outer arm of the first binding includes an extension that interfits with the second outer notch.

9. The level of claim 8 wherein the first outer notch is oriented parallel to the first surface of the main body; and
  wherein the extension of the first outer arm is oriented parallel to the first main binding wall.

10. The level of claim 7 wherein the first outer arm of the first binding, the second outer arm of the first binding, and the at least one intermediate arm of the first binding are oriented perpendicular to the first binding wall.

11. A method of manufacturing a level comprising:
  providing a main body, the main body having oppositely facing first and second surfaces and a pair of side surfaces therebetween, a first outer notch in a first one of the side surfaces spaced from the first surface, a second outer notch in a second one of the side surfaces spaced from the first surface, and at least one intermediate notch in the first surface, a third outer notch in the first one of the side surfaces spaced from the second surface, a fourth outer notch in the second one of the side surfaces spaced from the second surface, and at least one intermediate notch in the second surface;
  coupling a first binding to the main body so as to overlie the first surface, wherein the first binding includes a main binding wall, a first outer arm extending from a bottom surface of the main binding wall at a first side of the main binding wall and including a first engagement member, a second outer arm extending from the bottom surface of the main binding wall at a second side of the main binding wall and including a second engagement member, and at least one intermediate arm extending from the bottom surface of the main binding wall at a location between the first and second sides of the main binding wall, by positioning the first engagement member within the first outer notch, positioning the second engagement member within the second outer notch, and positioning the intermediate arm within the intermediate notch in the first surface; and
  coupling a second binding to the main body so as to overlie the second surface, wherein the second binding includes a main binding wall, a first outer arm extending from a top surface of the main binding wall at a first side of the main binding wall and including a third engagement member, a second outer arm extending from the top surface of the main binding wall at a second side of the main binding wall and including a fourth engagement member, and at least one intermediate arm extending from the top surface of the main binding wall at a location between the first and second sides of the main binding wall, by positioning the third engagement member within the third outer notch, positioning the fourth engagement member within the fourth outer notch, and positioning the intermediate arm within the intermediate notch in the second surface.

* * * * *